Feb. 27, 1923.
B. G. BRAINE
1,446,690
INSULATED RAIL JOINT
Filed Oct. 10, 1922
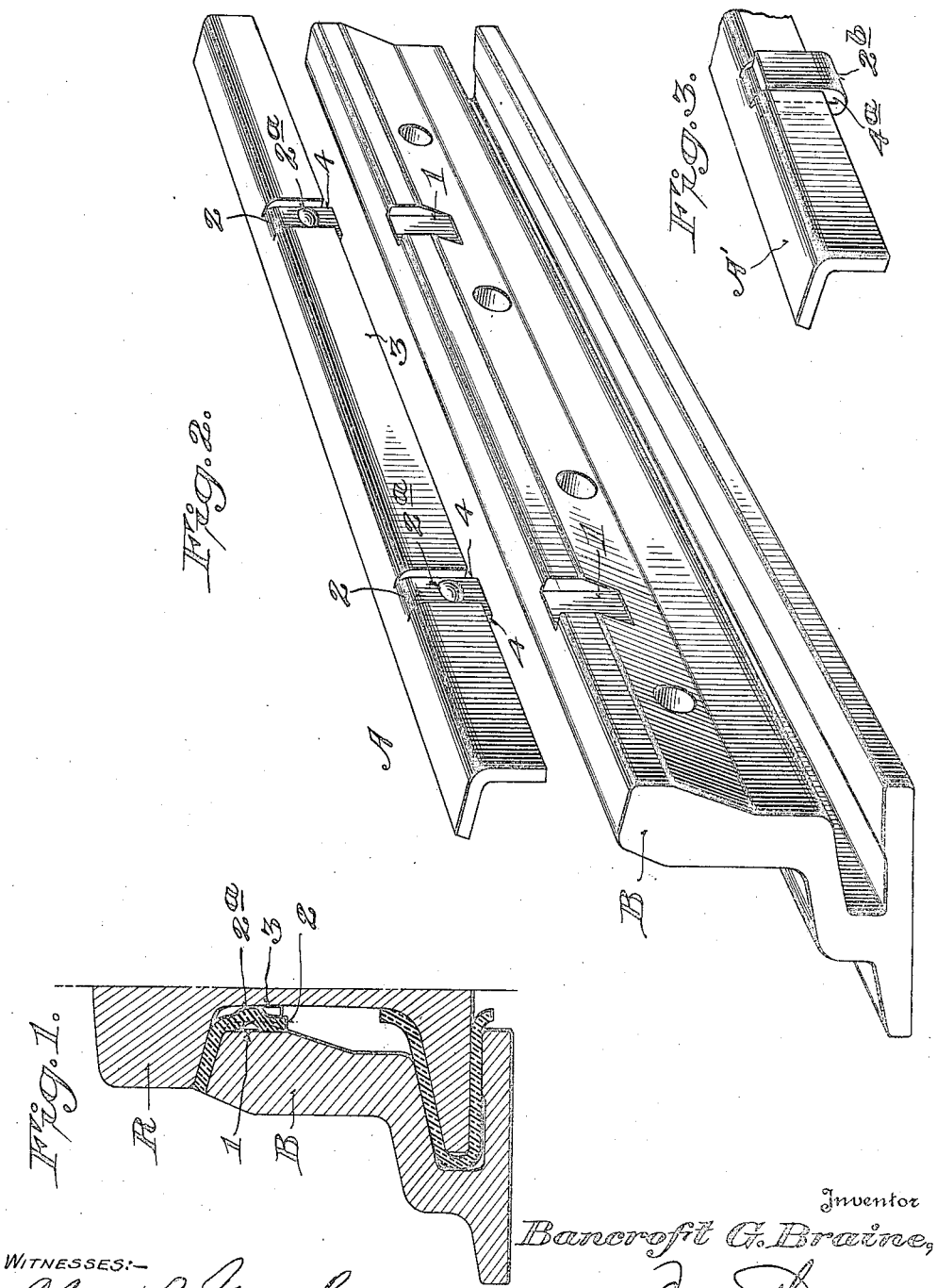
Inventor
Bancroft G. Braine,
By
Attorney
WITNESSES:—

Patented Feb. 27, 1923.

1,446,690

UNITED STATES PATENT OFFICE.

BANCROFT G. BRAINE, OF NEW YORK, N. Y., ASSIGNOR TO THE RAIL JOINT COMPANY, OF NEW YORK, N. Y., A CORPORATION OF NEW YORK.

INSULATED RAIL JOINT.

Application filed October 10, 1922. Serial No. 593,619.

*To all whom it may concern:*

Be it known that I, BANCROFT G. BRAINE, a citizen of the United States, residing at New York, in the county of New York and State of New York, have invented certain new and useful Improvements in Insulated Rail Joints, of which the following is a specification.

This invention relates to insulated rail joints of the type making special provision for preventing the movement or creeping of the head section of insulation confined between the head of the joint bar and the underside of the rail head.

A primary object of the invention is to provide a construction wherein the portion of the insulating fibre which interlocks with the joint bar is thoroughly protected from weather conditions which have the effect of softening or otherwise deteriorating the insulation, thereby rendering the interlock ineffective. That is to say, while it has been heretofore proposed to provide insulation having a locking engagement with the head of the bar, such arrangement involves the exposure of the anchoring or holding parts of insulation to water and moisture which causes the insulation to soften, thereby destroying the efficiency of the lock between the insulation and the joint bar.

In order to remedy such a condition the present invention proposes to provide an arrangement wherein the insulation interlocks with the head of the bar at the inner side of the latter, thereby having the advantage of being protected by the overlying head of the rail and preventing water and moisture from reaching the interlocking part of the insulation, and consequently effectively maintaining the efficiency of the interlock under all conditions of use.

A further object of the invention is to provide a simple and inexpensive construction that may be readily adapted to various types of joint bars of insulated joints and greatly preserve the life of the insulation by preventing the relative movement and consequent chafing of the insulation by the head of the bar and the underside of the rail head.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings in which, Figure 1 is a detail vertical sectional view illustrating the application of the invention.

Figure 2 is a perspective view of a joint bar and insulating head piece formed in accordance with the present invention.

Figure 3 is a detail perspective view illustrating a modified form of locking tongue on the insulation head piece.

Similar reference characters designate corresponding parts throughout the several figures of the drawings.

It is well known that one of the largest factors in the cost of insulated rail joint upkeep is the required replacement of the head sections of insulation which are confined between the heads of the joint bars and the undersides of the rail heads.

Due to the wave motion of the rail which is carried through the joint, the relative movement of the joint bar and rail not only produces a concentrated chafing action on the insulation, but also causes the same to move or creep out of position and, since it is impossible to control the relative movement between the joint bar and the rail head, it is desirable to anchor or hold the head section of insulation in such a manner that it will not work out of position.

To that end the present invention contemplates a novel interlocking engagement between the head section of insulation designated generally as A and the head of the bar B, whereby the relative movement of the insulation with respect to the rail head is arrested and the insulation maintained in its normal position and also the key portions thereof shielded against the deteriorating effect of water and moisture, thereby insuring a positive interlock throughout the life of the insulation.

By reference to the drawings it will be observed that one way of carrying the invention into effect is to provide the inside portion of the bar head B at suitable intervals with the vertically disposed notches 1 adapted to receive the locking tongues 2 formed in the inside skirt portion 3 of the insulating head section A. As usual the insulation A is preferably of hard fibre, and the locking tongues 2 thereof are preferably punched out from the skirt portion 3 of the insulation so as to present outwardly offset shoulders 4 for engaging with the sides of the notches 1 to prevent relative shifting or endwise movement of the insulation with reference to the head of the bar.

When the insulation A is in position, as shown in Figure 1 of the drawings, it will be apparent that the portion thereof which interlocks with the joint bar lies in a fully concealed and housed position beneath the rail head R and at the inside of the joint, that is, between the joint bar and the rail, thereby fully protecting and shielding the tongues 2. Due to the fact that the notches 1—1 are sufficiently spaced inwardly from the edges of the joint bar the locking tongues 2 are further protected and, since the entire section of insulation is rigidly clamped between the head of the joint bar and the underside of the rail head, it will be impossible for the tongues to work out of the recess or notches 1 in the joint bar.

The locking tongues 2 may be provided with the pressed out button, stud or equivalent projection 2$^a$, as shown in the drawing, thereby to engage with the rail web when the insulation unit is in place and prevent the shoulders 4 of the tongue from disengaging with the notch.

A modification of the locking tongue is shown in Figure 3 of the drawings wherein it will be observed that the insulation head piece A' is provided with a relatively long locking tongue 2$^b$ which is bent backwardly upon itself to provide a double thickness within the width of the slits which form the tongue, thereby providing relatively wide abutment shoulders 4$^a$ for engaging with the notches of the joint bar, and also providing a bearing against the rail web to positively hold the tongue in the notch.

From the foregoing it will be apparent that the present invention aims to provide a novel interlock between the head section of insulation and the joint bar whereby the strength of the interlock will be preserved, thereby materially adding to the life of the head section of insulation and serving positively to prevent the insulation from working out of place.

Without further description it is thought that the features and advantages of the improvement will be readily apparent to those skilled in the art and it will of course be understood that changes in the form, proportion, and other details of construction may be resorted to without departing from the spirit of the invention or scope of the appended claims.

I claim :—

1. An insulated rail joint including a joint bar, and a strip of insulation having a covered interlocking engagement with the bar beneath the rail head.

2. An insulated rail joint including a joint bar, and a head strip of insulation extending throughout the length of the bar and having an interlocking engagement with the inner side of said joint bar.

3. An insulated rail joint including a joint bar having a recess opening at the inside face of the bar head, and a head section of insulation having a portion thereof engaging in said recess.

4. An insulated rail joint including a joint bar having a recess at the inner side of its head portion, and a head section of insulation having a laterally displaced locking tongue adapted for engagement with said recess.

5. An insulated rail joint including a joint bar having a vertically disposed recess at the inside portion of its head and opening through the upper face of the head, and a head section of insulation having a locking tongue displaced laterally from the inner depending member thereof and adapted to engage in said recess.

6. An insulated rail joint including in combination with the joint bars and the rail, a head section of insulation fitted to the head of the joint bar and having a covered interlocking engagement therewith between the bar and the rail.

7. An insulated rail joint including a joint bar having a recess, a head section of insulation having a tongue engaging in said recess, and means whereby the tongue has a bearing engagement with the rail web.

8. An insulated rail joint including a joint bar having a recess, a head section of insulation having a tongue engaging in said recess, and a member formed from the tongue and having a bearing engagement with the rail web.

9. An insulated rail joint including a joint bar having a recess, a head section of insulation having a tongue engaging in said recess, and a button formed from the tongue and adapted to bear against the rail web.

10. An insulated rail joint including a joint bar, and a strip of insulation of angular cross section having an anti-creeping engagement with the inside face of the bar head.

11. An insulated rail joint including a joint bar and a strip of insulation of angular cross section having a portion thereof interlocking with the inside face of the bar head between the bar and the rail.

In testimony whereof I hereunto affix my signature in the presence of two witnesses.

BANCROFT G. BRAINE.

Witnesses:
E. K. KERSHNER,
C. A. DISBROW.